United States Patent
Foote

(10) Patent No.: US 9,088,766 B2
(45) Date of Patent: Jul. 21, 2015

(54) METHOD TO HIDE AND RECOVER DATA IN A VIDEO STREAM

(76) Inventor: Evan Michael Foote, Carmel, IN (US)

( * ) Notice: Subject to any disclaimer, the term of this patent is extended or adjusted under 35 U.S.C. 154(b) by 17 days.

(21) Appl. No.: 13/984,886

(22) PCT Filed: Mar. 25, 2011

(86) PCT No.: PCT/US2011/000548
§ 371 (c)(1),
(2), (4) Date: Aug. 12, 2013

(87) PCT Pub. No.: WO2012/134417
PCT Pub. Date: Oct. 4, 2012

(65) Prior Publication Data
US 2013/0322852 A1  Dec. 5, 2013

(51) Int. Cl.
H04N 5/91 (2006.01)
H04N 21/8358 (2011.01)
G06T 1/00 (2006.01)

(52) U.S. Cl.
CPC ............... *H04N 5/91* (2013.01); *G06T 1/0028* (2013.01); *H04N 21/8358* (2013.01); *G06T 2201/0081* (2013.01)

(58) Field of Classification Search
None
See application file for complete search history.

(56) References Cited

U.S. PATENT DOCUMENTS

| | | | |
|---|---|---|---|
| 6,285,774 B1 | 9/2001 | Schumann et al. | |
| 6,381,367 B1 | 4/2002 | Ryan | |
| 6,771,795 B1 | 8/2004 | Inardi | |
| 7,072,493 B2 | 7/2006 | Venkatesan et al. | |
| 7,392,394 B2 | 6/2008 | Levy | |
| 7,397,933 B2 | 7/2008 | Mihcak et al. | |
| 8,234,495 B2 | 7/2012 | Levy | |
| 2007/0038861 A1 | 2/2007 | Weber et al. | |
| 2009/0288170 A1 | 11/2009 | Osawa et al. | |
| 2009/0304077 A1* | 12/2009 | Wu et al. | 375/240.12 |
| 2013/0279741 A1* | 10/2013 | Celik et al. | 382/100 |
| 2013/0329941 A1* | 12/2013 | Thorwirth | 382/100 |

FOREIGN PATENT DOCUMENTS

| | | |
|---|---|---|
| GB | 2407227 | 4/2005 |
| GB | 2419489 | 2/2007 |
| JP | 6343128 | 12/1994 |

(Continued)

OTHER PUBLICATIONS

Lu et al., "An Effective Video Steganography Method for Biometric Identification," Advances in Computer Science and Information Technology, Springer Berlin Heidelberg, Jun. 23, 2010, pp. 469-479.

(Continued)

*Primary Examiner* — William C Vaughn, Jr.
*Assistant Examiner* — Eileen Adams
(74) *Attorney, Agent, or Firm* — Robert D. Shedd; Robert B. Levy

(57) ABSTRACT

The marking of a video stream to impart a unique identifier commences by first identifying portions within the video stream readily susceptible to change in a visually imperceptible manner. Thereafter, a combination of visually imperceptible changes is applied to the identified portions at random intervals for randomly varying intervals to mark the video stream. Each change in the stream correlates a particular bit sequence so that a combination of different changes yields a string of bit sequences that can particularly identify the stream.

14 Claims, 5 Drawing Sheets

(56) References Cited

FOREIGN PATENT DOCUMENTS

| | | |
|---|---|---|
| JP | 2002518899 | 6/2002 |
| JP | 2003032641 | 1/2003 |
| JP | 2003219376 | 7/2003 |
| JP | 2005513835 | 5/2005 |
| JP | 2007525729 | 9/2007 |
| JP | 2008546277 | 12/2008 |
| JP | 2009100296 | 5/2009 |
| JP | 2009543443 | 12/2009 |

OTHER PUBLICATIONS

Dittmann et al: A New Approach for Transformation Invariant Image and Video Watermarking in the Spatial Domain; Proceedings of SPIE; vol. 3971, p. 175-185; May 9, 2000.

International Search Report dated Dec. 22, 2011.

* cited by examiner

US 9,088,766 B2

METHOD TO HIDE AND RECOVER DATA IN A VIDEO STREAM

This application is a National Stage Application and claims the benefit, under 35 U.S.C. §365 of International Application PCT/US2011/000548 filed Mar. 25, 2011 which was published in accordance with PCT Article 21(2) on Oct. 4, 2012 in English.

TECHNICAL FIELD

This invention relates to a method for forensically marking a video stream with an identifier to enable identification of the source of unauthorized content replication.

BACKGROUND ART

The proliferation of electronic devices capable of displaying video information in the form of movies, television programs and games, for example, has prompted great demand for video content. The advent of low cost video recording devices and the ability to circumvent anti-copy protection techniques has lead to unauthorized copying and distribution of such video content. In an effort to reduce the incidence of unauthorized copying, content creators now place a forensic mark, sometimes referred to as a watermark, within the video content for identification. By tracing the forensic mark, the content creator can isolate the source of the unauthorized copies.

The forensic mark can take various forms. For example, a content creator can apply a unique serial number to each copy or to a batch of copies. Alternatively, the content creator could apply a unique combination of alphanumeric characters or graphical symbols. The nature of the mark will depend on various factors, including but not limited to, the nature of the content itself.

Present day techniques for forensically marking video content suffer from several difficulties. Placing a forensic mark within the image itself incurs the disadvantage that the forensic mark becomes easy to spot and easy to circumvent by either editing or applying pixilation to the mark for example. Altering the video format to create a forensic mark incurs the disadvantage that converting the video content from one format to another can destroy the mark.

Thus, a need exists for a technique for forensically marking video content that overcomes the aforementioned disadvantages.

BRIEF SUMMARY OF THE INVENTION

A method for marking a video stream with an identifier commences by first identifying portions within the video stream readily susceptible to change in a visually imperceptible manner. Thereafter, a combination of visually imperceptible changes is applied to the identified portions at random intervals to mark the video stream to permit subsequent identification. Each change in the stream correlates a particular bit sequence so that a combination of different changes yields a string of bit sequences that can particularly identify the stream.

The marking of the video stream by applying a combination visually imperceptible changes, for example, small amounts of stretching and cropping, allows for application of a mark that is recoverable notwithstanding copying and/or converting the video stream into a different file format.

DETAILED DESCRIPTION

Figure 1:
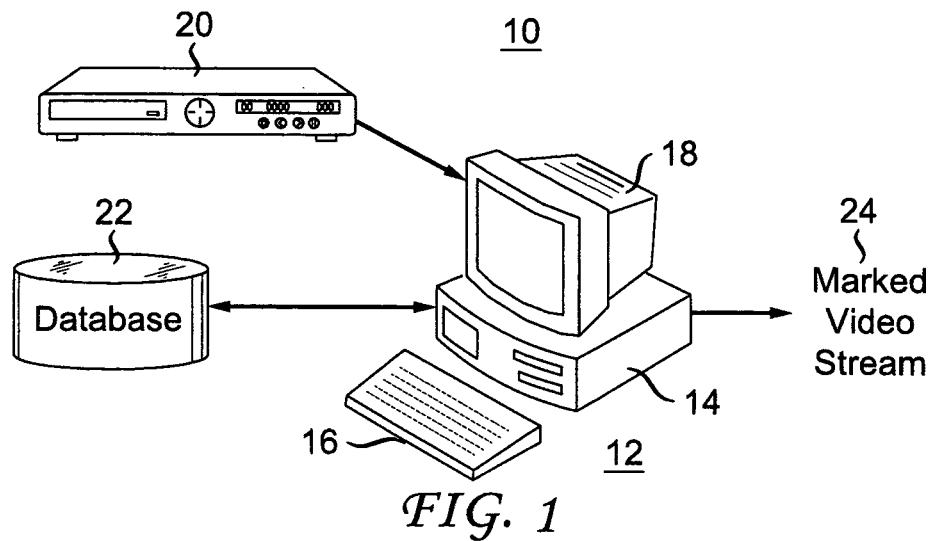
FIG. 1 depicts a block schematic diagram of a system, in accordance with a preferred embodiment of the present principles, for marking a video stream with a recoverable identifier.

FIG. 1 depicts a block schematic diagram of a system 10, in accordance with a preferred embodiment of the present principles for marking portions of a video stream to identify that steam. As described hereinafter, the system 10 imparts unique identifier by applying a combination of visually imperceptible changes, such as cropping and stretching, and to vary the locations where such visually imperceptible changes occur over time. The changes made to the video stream remain small enough as to be virtually unnoticed by the human eye. However, the changes, while virtually imperceptible, change the stream in a manner sufficient to enable detection upon comparison with the original stream. Thus, comparing the changed video stream to the original stream enables recovery of the identifier, thus allowing identification of the source of unauthorized copies of the video stream.

The system 10 includes a computer 12 typically comprised of a processor 14, a key board 16 and a monitor 18. The processor 14 executes software, which as described, will examine an incoming data stream, as received from a DVD player 20, a database 22 or other video source (not shown) to determine where and how to apply a combination of visually imperceptible changes (e.g., cropping and stretching) to uniquely identify the video stream. After having identified the how and where to apply the combination of visually imperceptible changes, the software executed by the processor 14 will apply a combination of visually imperceptible changes yield a marked video stream 24, i.e., a stream marked with a unique identifier. Further, the computer system 12 has the capability of comparing a video stream marked in the manner described to the original stream to retrieve the unique identifier.

Examining the video stream plays an important role in marking the video stream with the unique identifier since certain portions of the video stream do not comprise good candidates for changes. For example, changing a portion of the video stream that contains a scene with a fixed reference point, such as by cropping or stretching, will become obvious upon display so that the changes will not be virtually imperceptible as desired. Likewise, scenes with predictable motion also make poor candidates for changing. However, scenes with shaking or other types of motion make excellent candidates for changing, such as by stretching or cropping for example, because such a combination changes will appear virtually imperceptible to the human eye.

Figure 2:
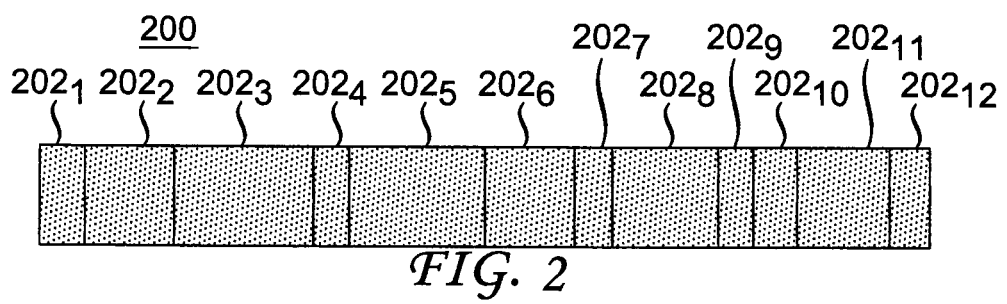
FIG. 2 depicts a portion of the video stream for marking by the system of FIG. 1.

As mention previously, the method of marking a video stream to impart a unique identifier in accordance with the present principle commences by first examining the video stream to determine which scenes can readily undergo change in a visually imperceptible manner. FIG. 2 depicts an exemplary portion of a video stream 200 comprising part of a piece of video content. As depicted in FIG. 2, the video stream 2200 possesses a plurality of scenes, identified as scenes $202_1$-$202_{11}$. Those skilled in the art will recognize that the video stream 200 of FIG. 2 could have a larger or smaller number of scenes. As mentioned previously not all of the scenes within the video stream, such as the video stream portion 200 represent good candidates for changing because even small changes, for example those made by stretching and cropping, will become readily apparent. Scenes with a fixed reference point and those with predicable motion constitute poor candidates for changing. On the other hand, scenes with unpredictable motion, e.g. shaking, represent excellent candidates for changing.

Figure 3:
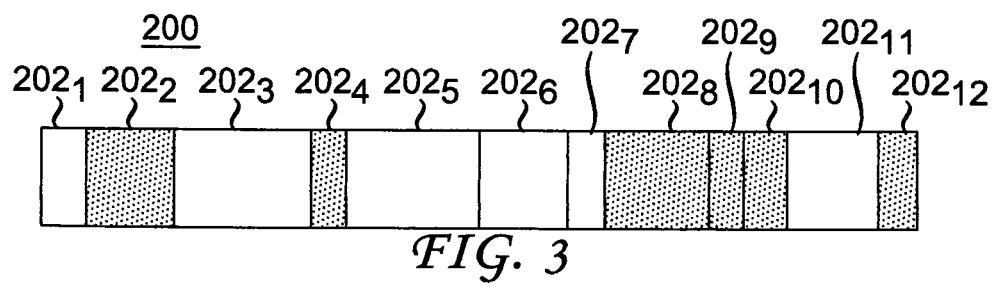
FIG. 3 depicts the video stream of FIG. 2 showing locations selected for imperceptible changes.

Referring to FIG. 3, the scenes identified as good candidates for change appear shaded, and scaled in time. Thus, for the video stream 200 of FIG. 3, the scenes $202_1$, $202_3$, $202_5$, $202_6$, $202_7$, and $202_{11}$ represent good candidates for making visually imperceptible changes.

Figure 4:
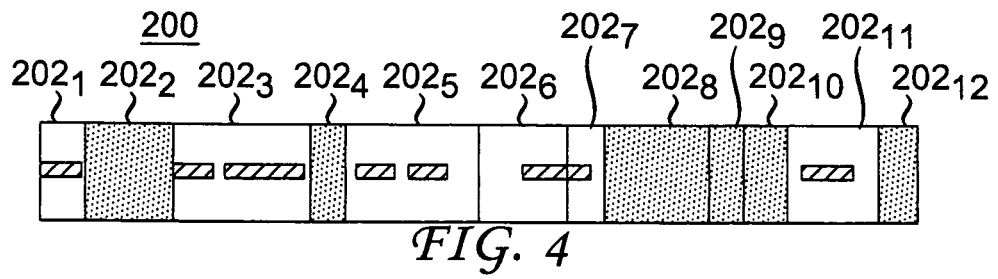
FIG. 4 depicts the portion of the video stream of FIG. 3 indicating where the visually imperceptible changes will occur and for how long.

To enhance the security of the video stream marking technique of the present principles, the changes should occur at random locations within the selected scenes and for random intervals. FIG. 4 depicts the video stream 200 of FIG. 3 with the location and duration of the changes in the selected scenes $202_1$, $202_3$, $202_5$, $202_6$, $202_7$, and $202_{11}$ depicted by solid bars.

Figure 5:
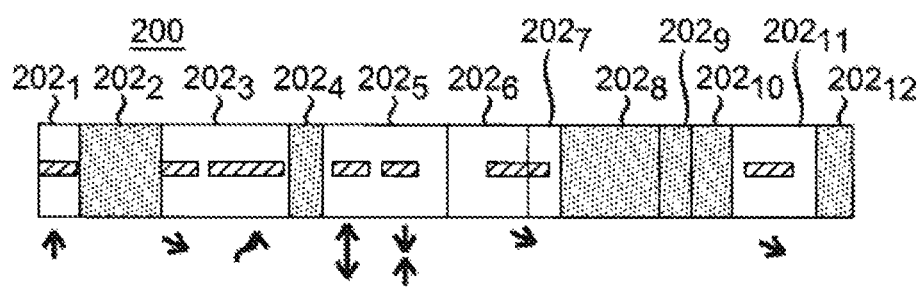
FIG. 5 depicts the portion of the video stream of FIG. 4 indicating the type of visually imperceptible change occurring within each identified area.

The type of change applied to selected scenes will depend on a variety of factors, including as the bit rate of the video stream, and the portions of the scene undergoing display, as well as type and intensity of the motion within the scene. A decision as to the type of change applied to the scenes can serve as a template for all identification data applied thereafter as indicated by the video scene depicted in FIG. 5 with symbols depicted beneath the selected scenes indicative of the type of change applied. In the illustrated embodiment, the symbols in FIG. 5 correspond to intended motions of the cropped area. For instance, the arrow associated with frame $202_1$ represents the cropped area from moving from the bottom of the frame to the top of the frame for each logical bit 1. The downward angled arrow below the first portion of frame $202_3$ as well as beneath frames $202_7$ and frame $202_{11}$ represents a linear motion of the cropped frame moving from the top left-hand corner to the bottom right corner. The two sets of arrows opposite each other in frame $202_5$ represent the cropped area stretching over the entire frame and shrinking from the entire frame, so that the video content effectively zooms out and zooms in, for each logical bit 1. Indentifying some areas as random noise will make it near impossible for pirates to identify which scenes contain data and which do not.

Figure 6:
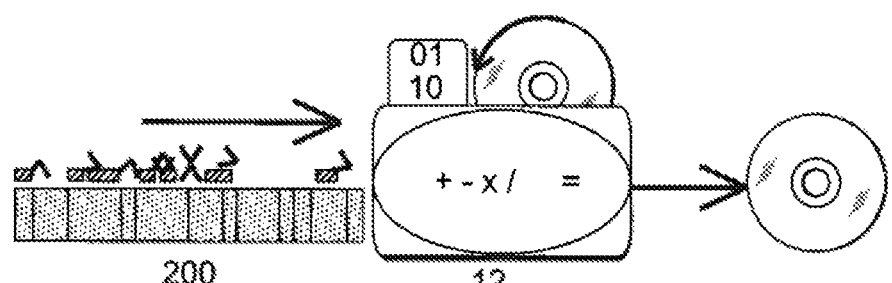
FIG. 6 graphically depicts the assignment of a unique identifier to the changed portions of the video stream of FIG. 5.

As discussed previously, a content creator can choose to assign an individual identifier, for example, a numeric serial number, to each copy of a tangible medium (e.g., a DVD or Blu-ray disc) storing video content. Each type of change, represented by a corresponding one of the symbols described with respect to FIG. 5, has an assigned a numeric character, typically combination of binary bits. During the process of replicating the original video content onto a tangible medium, the unique identifier, together with the template of different possible changes depicted in FIG. 5, undergo processing by the computer system 12, as depicted in FIG. 6. The computer system 12 changes selected scenes within at least a portion of the video content (e.g., the video stream 200) to mark the video content with unique identifier. Note that the serial number bits do not have need to reside in order and can (and should) be repeated multiple times during the entire video stream. This provides an indicator if the unauthorized video was comprised of multiple video sources spliced together.

Figure 7:
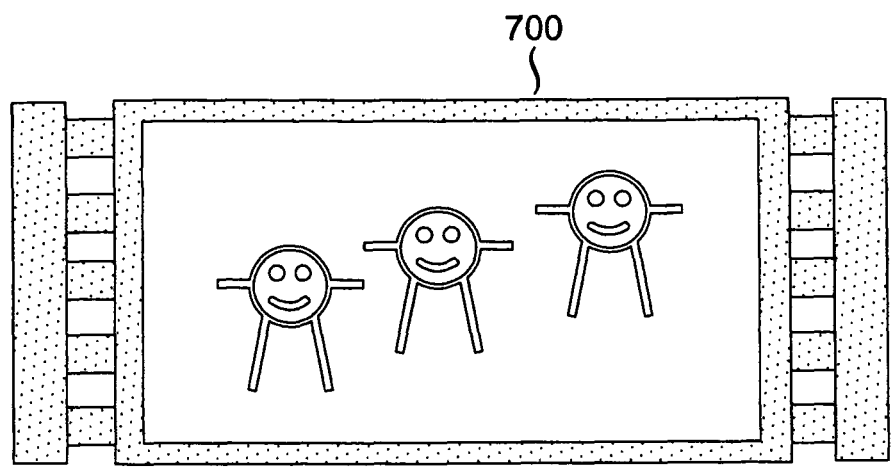
FIG. 7 depicts a frame of the video stream for marking.

To appreciate the process of making visually imperceptible changes, such as cropping, to the video stream to mark the stream with a unique identifier, refer to FIG. 7, which depicts a frame 700 of the original video, shown as film frame. To minimize the impact of a change such as cropping, the frame 700 should have a larger size than the frame intended for image capture. Further, the resolution should exceed 1920× 1080 pixels if possible.

Figure 8:
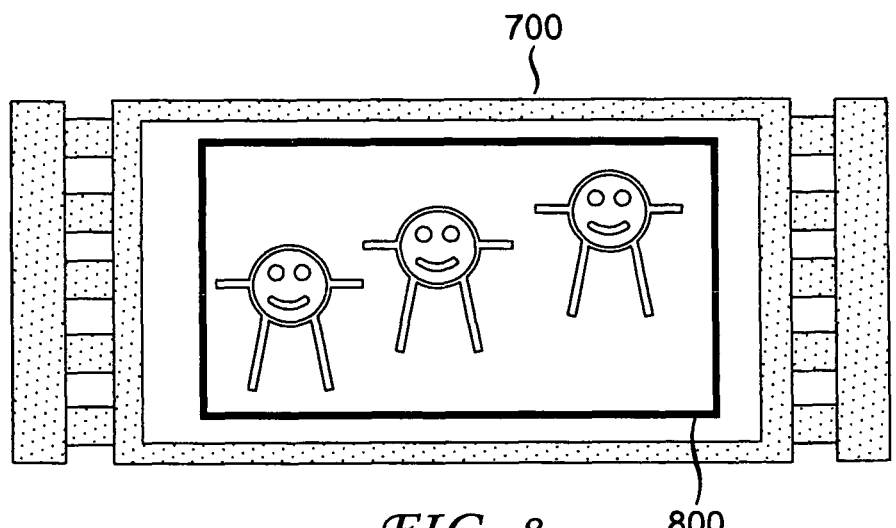
FIG. 8 depicts the frame of FIG. 7 following a first cropping operation.

Referring to FIG. 8, the frame 700 undergoes cropping, represented by the cropped area 800, for distribution using a given video format. The cropped area can be almost as large as the original source (with very little movement), or as small as the supported resolution. If the cropped area represents an area with dimensions larger than the supported resolution, the cropped area will be compressed to fit the supported resolution. The cropped area must have the same aspect ratio as the supported resolution. The cropped area can change in size during the content, so long as the result undergoes compression to the supported resolution. The area in the frame 700 outside the cropped area 800 is discarded.

Figure 9:
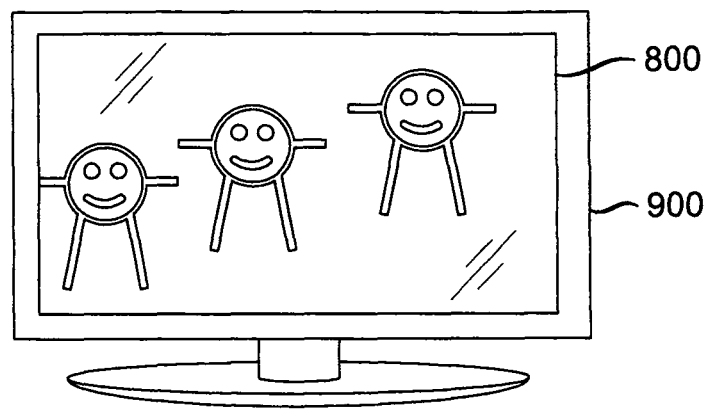
FIG. 9 depicts a display of the cropped frame of FIG. 7.

FIG. 9 depicts a typical 16×9-format display device 900. When the image appearing in the cropped area 800 undergoes display on the display device 900, the image in the cropped area 800 occupies the entire screen. Assuming the video content displayed on the display device 900 originated from an unauthorized copy, no difference would likely exist between the unauthorized copy and the original (except any quality loss in format conversion). Thus, the simple act of cropping the image would not readily yield a mechanism for identifying the source of the copies.

Figure 10:
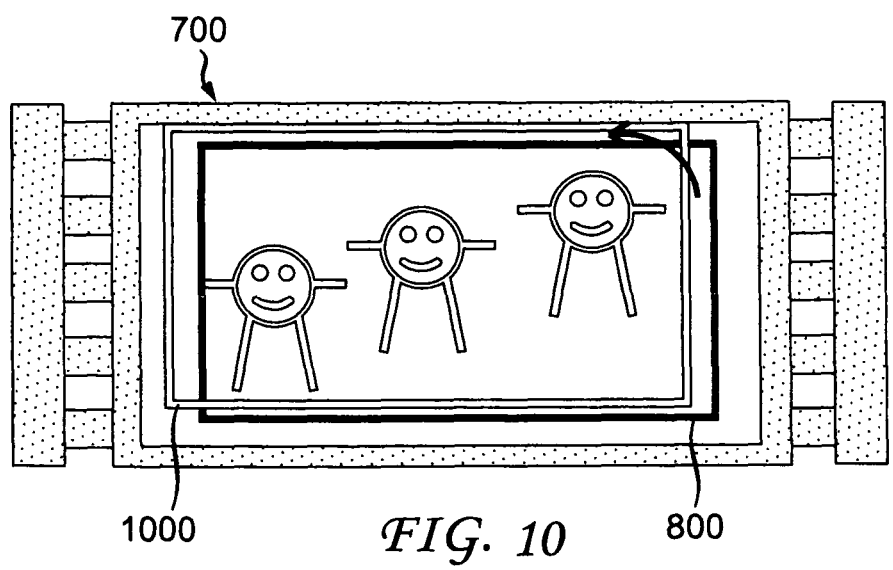
FIG. 10 depicts the frame of FIG. 7 following a second cropping operation.
Figure 11:
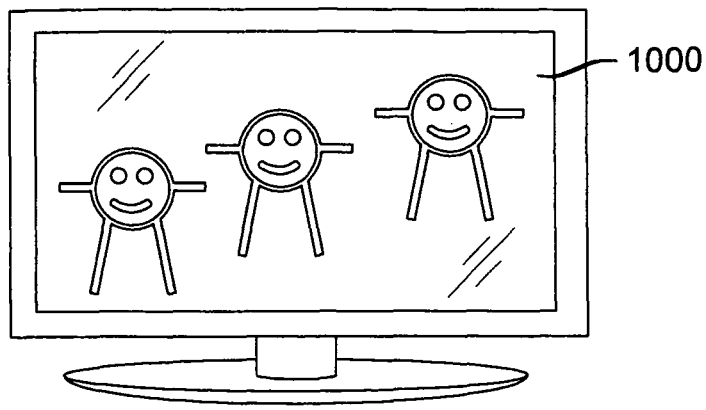
FIG. 11 depicts a display of the cropped frame of FIG. 10.

As discussed previously, the marking technique of the present principles advantageously varies the location and duration of the changes made in the vide stream 200 in a random manner. FIG. 10 shows a second cropping of the frame 700 to create a second cropped area 1000 offset from the cropped area 800. The offset between the cropped areas 800 and 1000 is small and have been exaggerated in FIG. 10. The transition between cropped areas (i.e., the change made in the video stream for marking purposes) correlates a particular bit sequence so that a combination of different changes (e.g., stretching and cropping) will yield a unique string of bit sequences that serve as a serial number. The transition between cropped areas will appear smooth, assuming sufficient time between scenes with motion. To avoid shifting of the picture on the screen, changing the scene by cropping should occur when sufficient motion exists in the frame so the cropping becomes virtually imperceptible to the human eye. FIG. 11 depicts a screen display of the cropped area 1000 observed by a viewer.

Figure 12:
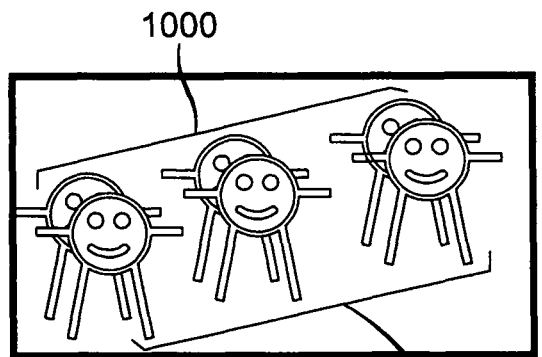
FIG. 12 depicts a display of the cropped frame of FIGS. 9 and 11 overlaid one on top of the other.

FIG. 12 depicts an overlay of the cropped areas, thus revealing the type and direction of movement to indicate the associated logical bit for this change in the video stream. As depicted in FIG. 12, the cropped area 1000 appears to move moving counter-clockwise, which makes the image appear to move the opposite direction. The types and directions of movement can vary from scene to scene. Overlaying unknown video with the original in a fixed position makes it easy to determine the movement of video.

In practice, the marking method of the present principles works best when the changes applied to the video stream occur prior to distribution. However, marking the video stream by making virtually imperceptible changes, as discussed above, can occur after distribution of the video content, assuming wide acceptance of the technique. Applying the changes to the video stream after distribution would require players to video content to have a unique ID, instead of the media. Further, broadcast of the template of FIG. 5 would need to occur. Applying the changes after distribution of the video content might render the content more susceptible to hacking, but afford a more cost-effective solution capable of broadcasting in real time.

Figure 13:
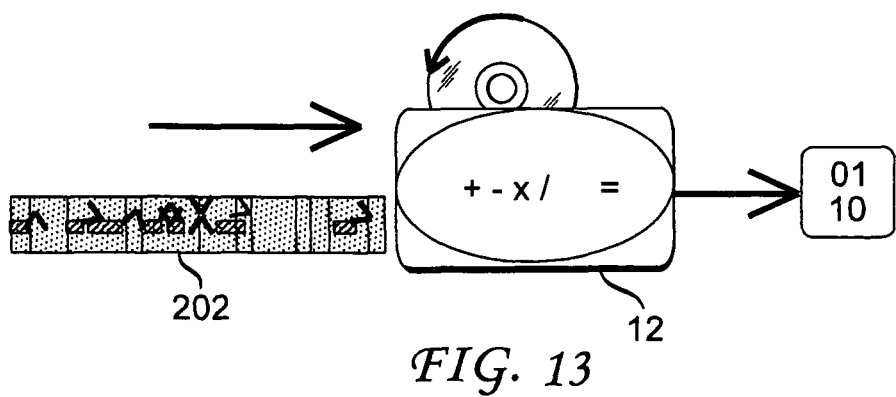
FIG. 13 graphically depicts decoding of a marked video stream to obtain the identifier associated with that stream.

Referring now to FIG. 13, the computer system 12 can also serve to undertake comparison of a unauthorized copy of video content, having a video stream 202 marked in the manner discussed, to an original copy of the content to recover the unique identifier to facilitate identification of the source of the unauthorized copy. To identify the serial number, the computer system 12 would correlate the changes made in the video content to bit sequence associated with each of the possible different changes.

The foregoing describes a technique for marking video content with a unique identifier.

The invention claimed is:

1. A method for marking a video stream with an identifier, comprising:
   identifying portions within the video stream susceptible to change in a visually imperceptible manner, said identifying further identifying portions of the video stream having unpredictable motion; and
   applying, a combination of visually imperceptible changes to the identified portions at random locations and at random intervals; wherein each change in the stream correlates a particular bit sequence so that the combination of changes yields a string of bit sequences that particularly identifies the stream, said applying further applying the combination of visually imperceptible changes to the identified portions at random locations and at random intervals of the portions of the video stream having unpredictable motion.

2. The method according to claim 1 wherein at least one of the combination of changes includes stretching the identified portion of the stream.

3. The method according to claim 1 wherein at least one of the combination of changes includes cropping the identified portion of the stream.

4. The method according to claim 1 wherein the marking of the stream occurs prior to distribution.

5. A method of recovering an identifier which identifies portions of a video stream having unpredictable motion, the video stream being marked by applying a combination of visually imperceptible changes to the identified portions at random locations and at random intervals of the portions of the video stream having unpredictable motion; wherein each change in the stream correlates a particular bit sequence, the method comprising:
   comparing the marked stream to an original version of the stream to ascertain the combination of changes made in the marked stream; and
   correlating the ascertained combination of changes to identify the bit sequence associated with each change and thereby recovers the identifier associated with the marked stream.

6. An apparatus for marking a video stream with an identifier, comprising:
   means for identifying portions within the video stream susceptible to change in a visually imperceptible manner, said identifying means further identifying portions of the video stream having unpredictable motion; and
   means for applying, a combination of visually imperceptible changes to the identified portions at random locations and at random intervals; wherein each change in the stream correlates a particular bit sequence so that the combination of changes yields a string of bit sequences that particularly identifies the stream, said applying means further applying the combination of visually imperceptible changes to the identified portions at random locations and at random intervals of the portions of the video stream having unpredictable motion.

7. The apparatus according to claim 6 wherein at least one of the combination of changes includes stretching the identified portion of the stream.

8. The apparatus according to claim 6 wherein at least one of the combination of changes includes cropping the identified portion of the stream.

9. The apparatus according to claim 6 wherein the apparatus the marks the stream prior to distribution.

10. An apparatus for marking a video stream with an identifier, comprising one or more processors, the one or more processors being configured to:
    identify portions within the video stream susceptible to change in a visually imperceptible manner and having unpredictable motion; and
    apply a combination of visually imperceptible changes to the identified portions at random locations and at random intervals of the portions within the video stream having unpredictable motion; wherein each change in the stream correlates a particular bit sequence so that the combination of changes yields a string of bit sequences that particularly identifies the stream.

11. The apparatus according to claim 10, wherein at least one of the combination of changes includes stretching the identified portion of the stream.

12. The apparatus according to claim 10, wherein at least one of the combination of changes includes cropping the identified portion of the stream.

13. The apparatus according to claim 10, wherein the apparatus the marks the stream prior to distribution.

14. An apparatus for recovering an identifier, comprising:
    one or more processors, the one or more processors being configured to:
    compare the marked stream to an original version of the stream to ascertain the combination of changes made in the stream following marking thereof; and
    correlate the ascertained combination of changes to identify the bit sequence associated with each change and thereby recover the identifier associated with the marked stream; wherein the identifier identifies portions of the video stream having unpredictable motion, with the stream being marked by applying a combination of visually imperceptible changes to the identified portions at random locations and at random intervals of the portions of the video stream having unpredictable motion.

* * * * *